(12) United States Patent
Fujii et al.

(10) Patent No.: US 6,329,311 B1
(45) Date of Patent: Dec. 11, 2001

(54) NON-REDUCIBLE DIELECTRIC CERAMIC MATERIAL, MAKING METHOD, AND MULTILAYER CERAMIC CAPACITOR

(75) Inventors: Mari Fujii; Akira Sato; Shigeki Sato; Takeshi Nomura, all of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/580,585

(22) Filed: May 30, 2000

Related U.S. Application Data

(63) Continuation of application No. PCT/JP99/05379, filed on Sep. 30, 1999.

(30) Foreign Application Priority Data

Sep. 30, 1998 (JP) .................................................. 10-292851

(51) Int. Cl.[7] ......................... C04B 35/47; C04B 35/465; C04B 35/48; C04B 35/49; H01G 4/12
(52) U.S. Cl. ........................ 501/136; 501/135; 361/321.4; 361/321.5
(58) Field of Search .................................. 501/135, 136; 361/321.4, 321.5

(56) References Cited

U.S. PATENT DOCUMENTS 5,204,301  4/1993  Ohkubo et al. .
6,118,648 * 9/2000  Kojima et al. ........................ 361/311

FOREIGN PATENT DOCUMENTS 63-126117  5/1987  (JP) .
63-254602  10/1988  (JP) .
63-254603  10/1988  (JP) .
63-289707  11/1988  (JP) .
63-289710  11/1988  (JP) .
5-51122  7/1993  (JP) .
5-51124  7/1993  (JP) .
5-51127  7/1993  (JP) .

* cited by examiner

*Primary Examiner*—David Brunsman
(74) *Attorney, Agent, or Firm*—Oblon, Spivak, McClelland, Maier & Neustadt, P.C.

(57) ABSTRACT

In conjunction with the manufacture of a multilayer ceramic capacitor having nickel-containing internal electrodes involving a polishing step for exposing the end of the internal electrodes, a non-reducible dielectric ceramic material is prepared, for the purpose of preventing the polishing step from being prolonged, by furnishing a calcined material containing a compound oxide represented by the formula (I):

$$[(Ca_xSr_{1-x})O]_m[(Ti_yZr_{1-y})O_2]$$

wherein $0 \leq x \leq 1$, $0 \leq y \leq 0.10$, and $0.75 \leq m \leq 1.04$, as a main component, adding 0.001–10 mol % based on the main component of MgO or rare earth oxide and firing the mixture. The ceramic material contains predetermined amounts of $SiO_2$ and BaO and/or CaO, and MnO as auxiliary components.

21 Claims, 4 Drawing Sheets

1 μm

1 μm

├──────┤
2 μm

├──────┤
2 μm

NON-REDUCIBLE DIELECTRIC CERAMIC MATERIAL, MAKING METHOD, AND MULTILAYER CERAMIC CAPACITOR

This is a continuation filing of PCT/JP99/05379 filed on Sep. 30, 1999.

TECHNICAL FIELD

This invention relates to a temperature-compensating dielectric ceramic material for used in multilayer ceramic capacitors having a base metal as the internal electrode, a method for preparing the same, and a multilayer ceramic capacitor using the same.

BACKGROUND OF THE INVENTION

Multilayer ceramic capacitors are widely utilized as electronic parts featuring a small size, high capacitance and high reliability, with a number of such capacitors being employed in one electronic equipment. In the recent drive toward small-size, high-performance equipment, there is an increasing requirement to develop multilayer ceramic capacitors to a smaller size, higher capacitance, lower cost, and higher reliability.

The multilayer ceramic capacitors are generally manufactured by alternately stacking layers of an internal electrode-forming paste and a dielectric layer-forming paste by a sheeting or printing method, followed by co-firing.

Dielectric ceramic materials used in prior art multilayer ceramic capacitors or the like have the nature that when fired in a reducing atmosphere, they are reduced into semiconductors. This required to use as the internal electrode material noble metals such as palladium, which do not melt at the temperature at which dielectric ceramic materials are sintered and are not oxidized when fired under an oxygen partial pressure high enough to prevent dielectric ceramic materials from converting into semiconductors. However, the noble metals such as Pd are expensive, imposing a substantial bar against reducing the cost and increasing the capacitance of multilayer ceramic capacitors.

Then, a study is being made on the use of relatively inexpensive base metals such as nickel and nickel alloys as the internal electrode material. In the event where base metals are used as the conductor of internal electrode, the internal electrodes can be oxidized upon firing in air. Therefore, co-firing of dielectric layers and internal electrodes must be effected in a reducing atmosphere. However, firing in a reducing atmosphere causes the dielectric layers to be reduced as mentioned above, resulting in a lower resistivity. Non-reducible dielectric ceramic materials were thus proposed.

Exemplary non-reducible dielectric ceramic materials are $(Ca,Sr)(Ti,Zr)O_3$ compositions with manganese oxide and silicon oxide added as disclosed in JP-A 63-126117, JP-A 63-289709, JP-A 5-217426, JP-B 5-51127, JP-B 5-51122, and JP-B 5-51124. In these patent publications, manganese oxide is added alone such that Mn substitutes for the (Ca,Sr) site whereas silicon oxide is added either alone or as one component of a compound oxide. Manganese oxide is an additive component for imparting reduction resistance whereas silicon oxide serves as a sintering aid. It is thus concluded that dielectric materials containing manganese oxide and silicon oxide are customarily used for ceramic capacitors having internal electrodes formed of noble metals such as nickel.

DISCLOSURE OF THE INVENTION

In multilayer ceramic capacitors, it sometimes happens that ends of internal electrodes are not exposed at the side surface of a capacitor chip at the end of firing because of the difference in shrinkage factor between internal electrodes and dielectric layers during firing. This requires to add a step of polishing a capacitor chip, as by barrel finishing, for exposing internal electrodes prior to the attachment of terminal electrodes to the side surface of a capacitor chip.

However, the inventors' research revealed that when dielectric ceramic materials containing manganese oxide and silicon oxide are co-fired with nickel internal electrodes in a reducing atmosphere and then subjected to re-oxidizing treatment, Mn—Ni compound oxide precipitates between nickel internal electrodes confined within the chip and the side surface of the chip. This Mn—Ni compound oxide is composed mainly of $NiMn_2O_4$ and more difficult to polish than dielectric ceramics. As a result, the polishing step for exposing ends of internal electrodes is prolonged. The long term of polishing step not only leads to a lowering of productivity, but also applies some load to the chip, causing defects such as cracks.

An object of the invention is, in the manufacture of a multilayer ceramic capacitor having nickel-containing internal electrodes, to prevent the polishing step for exposing ends of the internal electrodes from being prolonged.

This and other objects are achieved by any of the following embodiments of the present invention.

(1) A non-reducible dielectric ceramic material comprising a compound oxide represented by the formula (I):

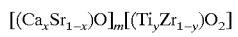

wherein $0 \leq x \leq 1$, $0 \leq y \leq 0.10$, and $0.75 \leq m \leq 1.04$, as a main component, 0.5 to 15 mol % based on the main component of $SiO_2$ and BaO and/or CaO as an auxiliary component, these oxides being calculated as a compound oxide represented by the formula (II):

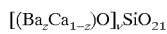

wherein $0 \leq z \leq 1$ and $0.5 \leq v \leq 4.0$, 0.2 to 5 mol % based on the main component of MnO as an auxiliary component, and 0.001 to 10 mol % based on the main component of MgO as an additive component, the material having been prepared by adding a starting raw material for the additive component to a calcined material containing the main component, followed by firing.

(2) A non-reducible dielectric ceramic material comprising a compound oxide represented by the formula (I):

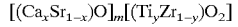

wherein $0 \leq x \leq 1$, $0 \leq y \leq 0.10$, and $0.75 \leq m \leq 1.04$, as a main component, 0.5 to 15 mol % based on the main component of $SiO_2$ as an auxiliary component, 0.2 to 5 mol % based on the main component of MnO as an auxiliary component, and 0.01 to 10 mol % based on the main component of at least one rare earth oxide selected from the group consisting of oxides of Sc, Y, La, Ce, Pr, Nd, Sm, Eu, Gd, Tb, Dy, Ho, Er, Tm, Yb and Lu, as an additive component.

(3) A non-reducible dielectric ceramic material according to (2) wherein the auxiliary component includes CaO and/or BaO, which are contained along with $SiO_2$ in such proportions as to provide a compound oxide represented by the formula (II):

$[(Ba_zCa_{1-z})O]_v SiO_2$ wherein $0 \leq z \leq 1$ and $0.5 \leq v \leq 4.0$.
(4) A non-reducible dielectric ceramic material according to (2) or (3) further comprising MgO.
(5) A non-reducible dielectric ceramic material according to any one of (1) to (4) further comprising up to 10 mol % based on the main component of $Al_2O_3$ as an auxiliary component.
(6) A non-reducible dielectric ceramic material according to any one of (1) to (5) which includes a silicon rich phase having a $SiO_2$ concentration of at least 10 mol %.
(7) A method for preparing a non-reducible dielectric ceramic material comprising
a compound oxide represented by the formula (I):

$[(Ca_xSr_{1-x})O]_m[(Ti_yZr_{1-y})O_2]$ wherein $0 \leq x \leq 1$, $0 \leq y \leq 0.10$, and $0.75 \leq m \leq 1.04$, as a main component,
0.5 to 15 mol % based on the main component of $SiO_2$ and BaO and/or CaO as an auxiliary component, these oxides being calculated as a compound oxide represented by the formula (II):

$[(Ba_zCa_{1-z})O]_v SiO_2$ wherein $0 \leq z \leq 1$ and $0.5 \leq v \leq 4.0$,
0.2 to 5 mol % based on the main component of MnO as an auxiliary component, and
0.001 to 10 mol % based on the main component of MgO as an additive component, the method comprising the steps of adding a starting raw material for the additive component to a calcined material containing the main component, followed by firing.
(8) A multilayer ceramic capacitor comprising a non-reducible dielectric ceramic material according to any one of (1) to (6) as a dielectric material and internal electrodes containing at least nickel.

BEST MODE FOR CARRYING OUT THE INVENTION

Figure 1:
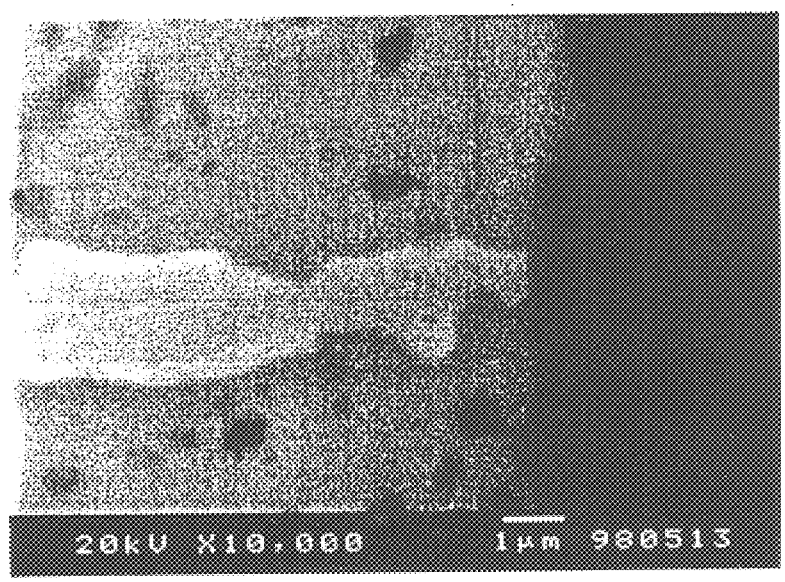
FIG. 1 is a drawing-substituting photograph representative of ceramic material structure, in the form of a composition image under SEM in the vicinity of an internal electrode end in a MgO-containing multilayer ceramic capacitor.

The ceramic material of the invention has a (Ca,Sr)(Ti,Zr)$O_3$ composition as a main component, contains at least MnO and $SiO_2$, and further contains MgO and/or rare earth oxide. The inclusion of MgO and rare earth oxide is effective for substantially preventing the above-described Mn—Ni compound oxide from precipitating between nickel internal electrodes and the side surface of the chip. This, in turn, prevents the step of polishing the side surface of the chip from being prolonged.

It is believed that precipitation of Mn—Ni compound oxide results from manganese migrating within the chip during firing and re-oxidizing treatment and bonding with nickel of the internal electrodes. Upon firing, there forms a silicon rich phase originating from $SiO_2$ added as the sintering aid. Although Mn is present within this silicon rich phase, the silicon rich phase has a so low melting point that Mn may leave the silicon rich phase during firing or re-oxidizing treatment. The migrated Mn comes in contact with an oxidizing atmosphere during the re-oxidizing treatment and forms a compound oxide with nickel. It is presumed that MgO and rare earth oxide added according to the invention bond with the silicon rich phase to raise its melting point for restraining migration of Mn. Accordingly, it is preferable to add MgO and rare earth oxide after the synthesis of the main component by calcination, in order to help them bond with the silicon rich phase. In particular, it is requisite that MgO be added after calcination of main component raw material.

The silicon rich phase does not develop simply by adding $SiO_2$, but forms when at least an amount of Mn is added. Specifically, the silicon rich phase develops when manganese oxide and silicon oxide are added together. The silicon rich phase is likely to develop at grain boundaries, especially at points where at least three crystal grains adjoin each other (e.g., triple points), but can develop within crystal grains. The silicon rich phase shows characteristics discriminable from crystal grains and other phases, for example, in a TEM (transmission electron microscope) photomicrograph. The silicon rich phase contains $SiO_2$ in a concentration exceeding the average concentration of $SiO_2$ in the entire ceramic material. Specifically, the concentration of $SiO_2$ in the silicon rich phase is usually at least 10 mol %. In addition of Si, Mn, Mg and rare earth element, the silicon rich phase also contains other constituent elements of the ceramic material. The silicon rich phase usually has a diameter of about 10 to 1,000 nm as ascertained in a TEM image.

Of the above-referred patent publications disclosing anti-reducing dielectric ceramic materials, JP-A 63-289709 discloses a ceramic composition comprising 100 parts by weight of a (Ca,Sr)(Ti,Zr)$O_3$ main component, and 0.01 to 4.00 parts by weight calculated as $MnO_2$ of Mn, 2.00 to 8.00 parts by weight of $SiO_2$, and 0.01 to 1.00 parts by weight (corresponding to 0.487 to 4.87 mol % based on the main component) of MgO as auxiliary components. This ceramic composition is the same as the ceramic material of the present invention in that MgO is contained. In this publication, however, MgO is calcined simultaneously with the raw material of the main component, differing from the present invention in this respect. When MgO is fired simultaneously with the raw material of the main component, the possibility of MgO bonding with the silicon rich phase is restrained, failing to attain the advantages of the invention.

Also, JP-B 5-51127 discloses a dielectric ceramic composition comprising 100 parts by weight of a basic composition based on (Ca,Sr,Mg,Mn)(Ti,Zr)$O_3$ and 0.2 to 15.0 parts by weight of an additive component, the additive component consisting of 40 to 80 mol % of $SiO_2$ and 20 to 60 mol % of MO wherein MO is at least one of BaO, MgO, ZnO, SrO and CaO. This ceramic composition is obtained by mixing the basic and additive components which have been respectively prepared by calcination, and firing the mixture. The invention described in this publication is the same as the present invention in that the calcination of a basic component raw material is followed by addition of MgO and firing. However this publication sets forth the basic composition in which Zr substitutes for 0.5 to 10% of Ti, which completely differs from the main composition of the present invention in which Ti substitutes for up to 10% of Zr. The present invention uses Zr rather than Ti as predominant in the main composition for the purpose of improving the temperature property of capacitance. The present invention aims to suppress the formation of Ni–Mn oxide due to the use of nickel electrodes in a composition system having good temperature property. By contrast, the invention of JP-B 5-51127 aims to afford an ability to fire at temperatures below 1,200° C., but not to minimize the temperature coefficient of dielectric constant. The ceramic composition described in the above publication has a temperature coefficient of dielectric constant of −600 to −3100 ppm/° C. (20 to 85° C.), which is large in magnitude. In one Example in the above publication in which the additive component contains MgO+BaO+CaO, ZnO and/or SrO is simultaneously added. Namely, the above publication lacks an example in which only MgO+BaO+CaO are added. The inclusion of ZnO or SrO as the auxiliary component offsets the additive effect of MgO.

The invention described in JP-B 5-51122 is the same as the invention described in the above-referred JP-B 5-51127 except that $B_2O_3$, $SiO_2$ and MO (defined above) are used as the additive component. Consequently, the composition described in this publication also has a temperature coefficient of dielectric constant of −600 to −3400 ppm/° C., which is large in magnitude. Also in one Example in this publication in which the additive component contains MgO+BaO+CaO, ZnO and/or SrO is simultaneously added, offsetting the additive effect of MgO.

The invention described in JP-B 5-51124 is the same as the invention described in the above-referred JP-B 5-51127 except that the amount of the additive component is 0.2 to 10.0 parts by weight, and $Li_2O$, $SiO_2$ and MO (defined above) are used as the additive component. Consequently, the composition described in this publication also has a temperature coefficient of dielectric constant of −630 to −3400 ppm/° C., which is large in magnitude. Additionally, since the inclusion of $Li_2O$ brings a substantial drop of the melting point of the additive component, the MgO's effect of suppressing migration of Mn becomes insufficient, failing to achieve advantages as in the present invention.

JP-A 63-126117 discloses a dielectric ceramic composition comprising 100 parts by weight of a main component based on $(Ca,Sr)(Ti,Zr)O_3$, 0.5 to 8 parts by weight of $MnO_2$, and 0.5 to 8 parts by weight of a glass component which may contain MgO. This dielectric ceramic composition is the same as the ceramic material of the present invention in that the composition is prepared by calcining a main component raw material and then adding an auxiliary component or a glass component as an additive component. However, the glass component in this publication contains $Li_2O$ like the additive component of the above-referred JP-B 5-51124, resulting in a too low melting point. As a consequence, the MgO's effect of suppressing migration of Mn becomes insufficient, failing to achieve advantages as in the present invention.

Now, the embodiments of the invention are described.

The present invention encompasses Embodiments 1 and 2 to be described below.

Embodiment 1

The non-reducible dielectric ceramic material (referred to simply as ceramic material, hereinafter) of this embodiment is prepared by adding a starting raw material for the additive component to a calcined material containing the main component, followed by firing. A starting raw material for the auxiliary component and/or calcined material thereof may be calcined together with a starting raw material for the main component, or added along with the starting raw material for the additive component, or a part thereof may be calcined together with a starting raw material for the main component and the remainder be added along with the starting raw material for the additive component.

The main component contains a compound oxide represented by the formula (I):

In formula (I), $0 \leq x \leq 1$, that is, the main component may contain either one of Ca and Sr and the mixing ratio of Ca and Sr is arbitrary. The optimum value of x is determined in relation to y.

In formula (I), $0 \leq y \leq 0.10$, and preferably $0 \leq y \leq 0.07$. If y is too large, the frequency dependency of capacitance and tan δ becomes increased, and the temperature dependency of electrostatic capacity also becomes increased.

In formula (I), $0.75 \leq m \leq 1.04$. If m is too small, the frequency dependency of capacitance and tan δ becomes increased. If m is too large, the firing temperature must be elevated, with the concomitant difficulty of firing at temperatures below 1,300° C., for example.

The auxiliary components are $SiO_2$, BaO and/or CaO, and MnO.

$SiO_2$ contained as the auxiliary component serves as a sintering aid. The addition of CaO and/or BaO in combination with $SiO_2$ is effective for significantly improving sinterability and thus producing a dense ceramic material. The combined addition of these oxides is also effective for extending the accelerated lifetime of insulation resistance. Notably, this effect is outstanding especially when the dielectric layer is made thin. Provided that these oxides form a compound oxide represented by the formula (II):

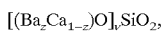

the proportion of this compound oxide relative to the main component is 0.5 to 15 mol %, and preferably 1 to 5 mol %. Too small a proportion leads to insufficient sinterability and too large a proportion exacerbates sinterability.

The proportion of the respective oxides is such that z and v in formula (II) are $0 \leq z \leq 1$ and $0.5 \leq v \leq 4.0$, and preferably $0.5 \leq z \leq 1$ and $0.55 \leq v \leq 3.0$. If v in formula (II) is too small, the IR accelerated life becomes short when the dielectric layer has a thickness of less than 5 μm. Inversely, too large v leads to poor sinterability. In the invention, the respective oxides serving as constituents of the compound oxide may be independently added so as to provide a proportion as specified in formula (II). However, in practice, it is more preferred to add the oxides in the form of a compound oxide represented by formula (II) to the main component raw material. This compound oxide has a melting point which is low enough to ensure good reactivity with the main component, but not too low as to impede the additive effect of MgO.

MnO contained as the auxiliary component serves as a reduction resistance-imparting agent and sintering aid. The content of MnO is 0.2 to 5 mol %, and preferably 0.2 to 3 mol % based on the main component. Too less contents of MnO result in insufficient anti-reducing ability and poor sinterability. On the other hand, too large contents of MnO result in increased temperature coefficients of dielectric constant and electrostatic capacity and increased frequency dependency of dielectric dissipation factor (tan δ).

In this embodiment, $Al_2O_3$ may be further added as the auxiliary component. $Al_2O_3$ serves as a reduction resistance-imparting agent and sintering aid. The content of $Al_2O_3$ is preferably up to 10 mol %, more preferably up to 5 mol %, and most preferably up to 0.5 mol % based on the main component. Too large contents of $Al_2O_3$ result in lower dielectric constants. Notably, in order that $Al_2O_3$ exert satisfactorily the effect of improving reduction resistance and sinterability, the content of $Al_2O_3$ should preferably be at least 0.1 mol %, and especially at least 0.2 mol % based on the main component.

MgO contained as the additive component is effective in restraining precipitation of Mn—Ni compound oxide between internal electrodes and the side surface of a chip as previously mentioned. The content of MgO is 0.001 to 10 mol %, preferably 1 to 6 mol %, and more preferably 3 to 6 mol % based on the main component. At too low MgO contents, it becomes substantially impossible to restrain precipitation of Mn—Ni compound oxide. On the other hand, too high MgO contents lead to poor sinterability.

It is understood that although in this specification, the oxides contained as the auxiliary and additive components are expressed by their stoichiometric compositions, these oxides in the ceramic material may deviate more or less from their stoichiometric compositions. For example, the manganese oxide is not limited to MnO and may be $MnO_2$ or another manganese oxide.

Embodiment 2

The ceramic material of Embodiment 2 is the same as that of Embodiment 1 in that the main component is a compound oxide represented by formula (I) and MnO is contained as the auxiliary component, with the content of MnO being also the same as in Embodiment 1. Embodiment 2 encompasses not only a construction in which $SiO_2$ and CaO and/or BaO are contained as the auxiliary component in an amount of the same range as in Embodiment 1, but also a construction in which only $SiO_2$ is contained. In the event where only $SiO_2$ is contained, the content of $SiO_2$ is 0.5 to 15 mol %, and preferably 1 to 5 mol % based on the main component.

In this embodiment, at least one rare earth oxide is contained as the additive component. Like MgO added in Embodiment 1, the rare earth oxide is effective in restraining precipitation of Mn—Ni compound oxide between internal electrodes and the side surface of a chip. The rare earth oxide is also effective for reducing the temperature coefficient of electrostatic capacity and improving the frequency dependency of dielectric dissipation factor. The rare earth element used herein is at least one selected from among Sc, Y, La, Ce, Pr, Nd, Sm, Eu, Gd, Tb, Dy, Ho, Er, Tm, Yb and Lu. The content of rare earth oxide is 0.01 to 10 mol %, preferably 1 to 6 mol % based on the main component. At too low rare earth oxide contents, it becomes substantially impossible to restrain precipitation of Mn—Ni compound oxide. On the other hand, too high rare earth oxide contents lead to poor sinterability.

It is noted that in Embodiment 2, the percent molar fractions of rare earth oxides relative to the main component are determined by converting the rare earth oxides into $ScO_{3/2}$, $YO_{3/2}$, $LaO_{3/2}$, $CeO_2$, $PrO_{11/6}$, $NdO_{3/2}$, $SmO_{3/2}$, $EuO_{3/2}$, $GdO_{3/2}$, $TbO_{3/2}$, $DyO_{3/2}$, $HoO_{3/2}$, $ErO_{3/2}$, $TmO_{3/2}$, $YbO_{3/2}$, and $LuO_{3/2}$, respectively.

A relatively large amount of rare earth oxide added sometimes adversely affects sinterability. In such a case, the firing temperature is elevated whereby a dense sintered body can be produced.

Also in Embodiment 2, $Al_2O_3$ may be added as the auxiliary component. An appropriate content of $Al_2O_3$ is the same as in Embodiment 1.

It is noted that in Embodiment 2, MgO may be added as part of the additive component. To prevent the degradation of sinterability, the content of MgO and rare earth oxide combined is preferably not more than 10 mol % based on the main component.

Multilayer Ceramic Capacitor

The multilayer ceramic capacitor of the invention may be constructed in any desired manner except that it uses the ceramic material of the invention in dielectric layers and a base metal in internal electrodes.

The conductor of the internal electrode uses a base metal containing at least nickel. Exemplary base metals are nickel and nickel alloys. The preferred nickel alloys are alloys of nickel with at least one of Mn, Cr, Co and Al. The nickel alloys preferably have a nickel content of at least 95% by weight.

In the dielectric layer, the ceramic material preferably has a mean crystal grain size of up to 3 μm, more preferably up to 2.5 μm, and further preferably up to 1.5 μm. The lower limit of the mean grain size is not critical although it is usually about 0.1 μm. When the mean grain size is in excess of 3 μm, multilayer ceramic capacitors with dielectric layers of less than 5 μm thick have a short IR accelerated lifetime and become difficult to acquire high reliability.

Preparation Method

Like prior art multilayer ceramic capacitors, the multilayer ceramic capacitor of the invention is prepared by forming a green chip by a printing or sheeting technique using a paste, printing an internal electrode paste thereon, and printing or transferring external electrodes, followed by firing. The preparation method is described below in detail.

As the starting raw material for the main component, use may be made of $CaTiO_3$, $SrTiO_3$, $CaZrO_3$, and $SrZrO_3$ which are synthesized, for example, by hydrothermal synthesis. As the starting raw materials for the auxiliary and additive components, use may be made of a variety of oxides and compounds capable of converting into oxides upon firing, for example, $SiO_2$, $BaCO_3$, $CaCO_3$, $Al_2O_3$, $MnCO_3$, MgO, $MgCO_3$, and the above-described rare earth oxides.

According to the invention, as previously described, at least a starting raw material for the main component is first calcined to form a calcined material, at least a starting raw material for the additive component is then added to the calcined material, and the mixture is fired. In particular, this process is requisite in Embodiment 1. The way of adding the auxiliary component is not critical. For example, a starting raw material for the auxiliary component and/or a calcined material thereof may be calcined together with the starting raw material for the main component, or added along with the starting raw material for the additive component, or a part thereof may be calcined together with the starting raw material for the main component and the remainder be added along with the starting raw material for the additive component.

The calcined material of the starting raw material for the auxiliary component is a compound oxide prepared by mixing two or more starting raw materials for the auxiliary component and calcining the mixture. In the practice of the invention, a compound oxide represented by the above formula (II) is preferably used as the calcined material for the auxiliary component although MnO may be contained in this calcined material.

The starting raw material for the additive component may be added alone or added after being calcined together with at least a part of the starting raw material for the auxiliary component. It is noted that when the starting raw material for the additive component is added alone, the effect by the inclusion of the additive component becomes greater.

Calcination of the starting raw material for the main component is usually effected in air, preferably at 1,000 to 1,300° C. for about 1 to about 4 hours. Calcination of the starting raw material for the auxiliary component with or without the starting raw material for the additive component added thereto is usually effected in air, preferably at 800 to 1,200° C. for about 1 to about 4 hours.

It is noted that the starting raw material and calcined material are usually utilized in powder form preferably having a mean particle size of about 0.1 to about 3 $\mu$m.

Next, a dielectric paste is prepared using the calcined materials or starting raw materials. The dielectric paste may be either an organic one obtained by milling the powder with an organic vehicle or an aqueous one. The organic vehicle used herein is obtained by dissolving a binder in an organic solvent. The binder used in the organic vehicle is not critical and may be suitably selected from conventional binders such as ethyl cellulose and polyvinyl butyral. Also, the organic solvent used is not critical and may be suitably selected from various organic solvents such as terpineol, butyl carbitol, acetone, and toluene, in accordance with a particular method employed such as a printing or sheeting method. Where the dielectric paste is an aqueous paint, an aqueous vehicle obtained by dissolving a water-soluble binder and a dispersant in water is milled with the powder. The water-soluble binder used in the aqueous vehicle is not critical, and use may be made of polyvinyl alcohol, cellulose and water-soluble acrylic resins, for example.

In the event where the printing method is employed, the dielectric paste and a paste of the internal electrode material are printed on a substrate of polyethylene terephthalate (PET) or the like in plural layers, the printed substrate is cut to the desired shape, and the multilayer is separated from the substrate, yielding a green chip. In the event where the sheeting method is employed, green sheets are formed using the dielectric paste, an internal electrode paste is printed on the green sheets, and the printed sheets are stacked and cut to the desired shape, yielding a green chip.

The internal electrode paste is prepared by milling with the organic vehicle a conductor which is selected from the above-described conductive metals and alloys, or any of oxides, organometallic compounds or resinates which converts into the conductor upon firing.

The resulting green chip is subjected to binder burnout. The binder burnout treatment of the green chip is preferably by holding in air at about 200 to about 400° C. for about ½ to about 24 hours.

Firing is effected in a reducing atmosphere (having an oxygen partial pressure of $10^{-8}$ to $10^{-12}$ atm.) for preventing oxidation of the internal electrodes. The firing temperature is preferably up to 1,400° C., and more preferably 1,200 to 1,300° C., and the firing time is preferably about 2 to 3 hours.

After firing, re-oxidation treatment of the dielectric is effected to produce a sintered chip. The re-oxidation treatment may be effected in an atmosphere having an oxygen partial pressure of $10^{-5}$ to $10^{-8}$ atm., preferably at 1,100° C. or lower, more preferably 800 to 1,100° C. for about 2 to 4 hours.

The sintered chip thus obtained is subjected to edge polishing as by barrel finishing or sand blasting, to thereby expose ends of the internal electrodes. Subsequently, an external electrode paste is printed or transferred to the chip and baked to form external electrodes. Baking may be effected, for example, by holding in nitrogen gas at 600 to 800° C. for about 0.1 to 1 hour. It is preferable that a coating be formed on the external electrode surface as by plating, if necessary. Understandably, the external electrode paste may be prepared in the same manner as the internal electrode paste.

EXAMPLE

Example 1

As the starting raw material powder for the main component, there were furnished $CaZrO_3$, $SrZrO_3$ and $CaTiO_3$ by hydrothermal synthesis (all available from Sakai Chemical K.K.). They were weighed such that the final composition might become $(Ca_{0.70}Sr_{0.30})(Ti_{0.03}Zr_{0.97})O_3$, and calcined in air at 1,200° C. for 3 hours, yielding a calcined material for the main component.

As the starting raw material powders for the additive and auxiliary components, there were furnished $MnCO_3$, $BaCO_3$, $CaCO_3$, $SiO_2$, $MgO$, and $Al_2O_3$. By wet milling $BaCO_3$, $CaCO_3$ and $SiO_2$ in a ball mill for 16 hours, drying the mixture, calcining the mixture in air at 1,150° C., and wet milling in a ball mill for 100 hours, there was prepared (BaCa) $SiO_3$ powder.

The calcined material for the main component, (BaCa) $SiO_3$ powder and another starting raw material were wet mixed, dewatered, and dried, yielding a dielectric raw powder. In this powder, $MnCO_3$ was 1 mol % based on the main component, $(BaCa)SiO_3$ was 2.8 mol % based on the main component, MgO was 6 mol % based on the main component, and $Al_2O_3$ was 0.2 mol % based on the main component. For comparison purposes, another dielectric raw powder was prepared without adding MgO.

Next, a dielectric paste was prepared by adding 5.4 parts by weight of an acrylic resin, 45 parts by weight of methylene chloride, 16 parts by weight of ethyl acetate, 6 parts by weight of mineral spirits, and 4 parts by weight of acetone to 100 parts by weight of the dielectric raw powder and milling the ingredients in a ball mill.

Additionally, an internal electrode paste was prepared by milling 100 parts by weight of nickel powder having a mean particle size of 0.8 $\mu$m, 35 parts by weight of an organic vehicle (containing 8 parts by weight of ethyl cellulose resin dissolved in 92 parts by weight of butyl carbitol), and 7 parts by weight of butyl carbitol. Also, an external electrode paste was prepared by milling 100 parts by weight of copper powder having a mean particle size of 0.5 $\mu$m, 35 parts by weight of an organic vehicle (containing of 8 parts by weight of ethyl cellulose resin dissolved in 92 parts by weight of butyl carbitol), and 7 parts by weight of butyl carbitol.

Using the dielectric paste, a green sheet of 7 $\mu$m thick was formed on a PET film; the internal electrode paste was printed thereon; and the sheet was peeled from the PET film. One hundred (100) sheets thus prepared were stacked one on top of the other and bonded under pressure, yielding a green laminate. The green laminate was then cut into green chips, on which binder removal, firing and re-oxidation treatments were effected under the conditions shown below. There were obtained MgO-containing sintered chips and MgO-free sintered chips.

Binder Removal Treatment Conditions

Holding temperature: 280° C.

Temperature holding time: 8 hours

Atmosphere: air
Firing Conditions
　Holding temperature: 1300° C.
　Temperature holding time: 2 hours
　Atmosphere gas: humidified $N_2+H_2$ mixed gas
　Oxygen partial pressure: $8.3 \times 10^{-11}$ atm.
Re-oxidizing Conditions
　Holding temperature: 1100° C.
　Temperature holding time: 3 hours
　Atmosphere gas: humidified $N_2$ gas
　Oxygen partial pressure: $4.17 \times 10^{-7}$ atm.

It is noted that a wetter at a water temperature of 35° C. was used for humidifying the atmosphere gas during firing and annealing.

Next, these sintered chips were cut in a cross section perpendicular to the internal electrodes, whose composition image (backscattered electron image) and EDS image were observed under a scanning electron microscope.

Figure 2:
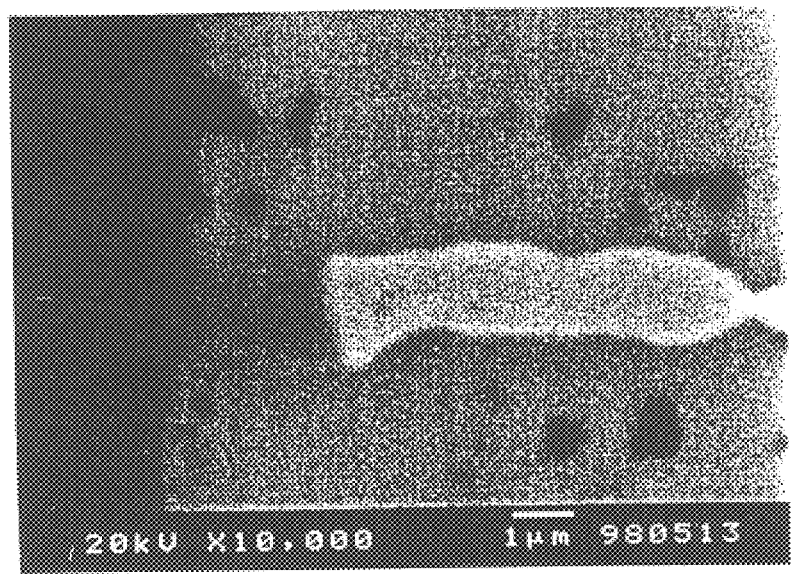
FIG. 2 is a drawing-substituting photograph representative of ceramic material structure, in the form of a composition image under SEM in the vicinity of an internal electrode end in a MgO-free multilayer ceramic capacitor.

FIG. 1 is a composition image of the MgO-containing chip in the vicinity of an internal electrode end. FIG. 2 is a composition image of the MgO-free chip. In FIGS. 1 and 2, a region with the highest lightness corresponds to the internal electrode and a region with an intermediate lightness corresponds to the ceramic body. More specifically, in FIG. 1, the internal electrode extends from the side surface of the chip to the left as viewed in the figure. In FIG. 2, the internal electrode extends from the side surface of the chip to the right as viewed in the figure. In FIG. 1, the internal electrode reaches substantially the chip side surface, indicating the ease of polishing for exposing the internal electrode end at the chip side surface. In contrast, it is seen in FIG. 2 that a dark colored region exists between the internal electrode end and the chip side surface.

Figure 3:
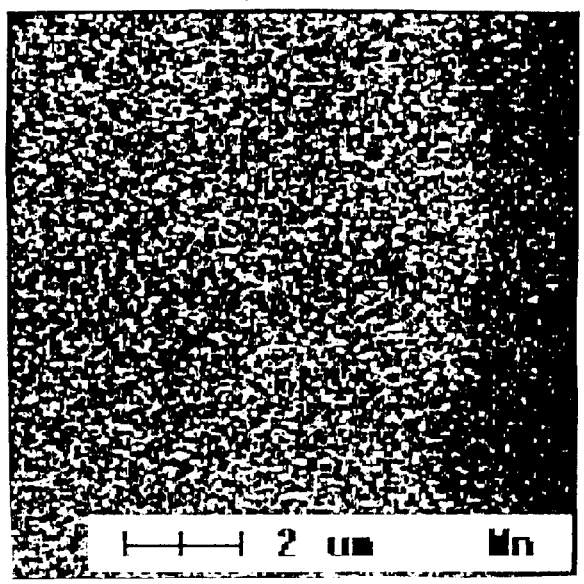
FIG. 3 is a drawing-substituting photograph representative of ceramic material structure, in the form of an EDS image under SEM in the vicinity of an internal electrode end in a MgO-containing multilayer ceramic capacitor.
Figure 4:
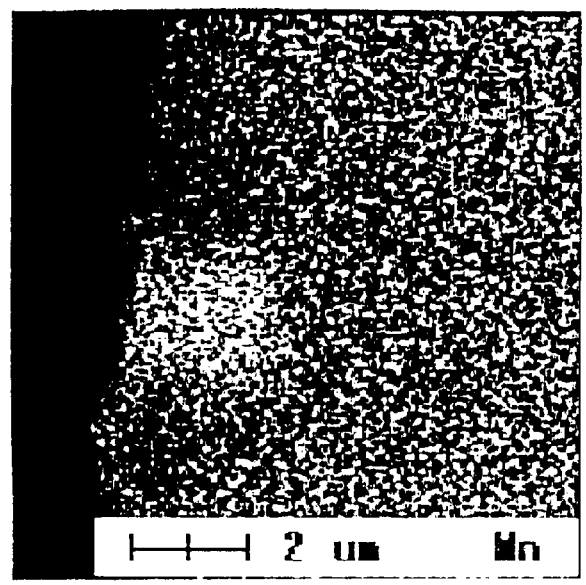
FIG. 4 is a drawing-substituting photograph representative of ceramic material structure, in the form of an EDS image under SEM in the vicinity of an internal electrode end in a MgO-free multilayer ceramic capacitor.

FIGS. 3 and 4 are energy dispersive x-ray spectrometry (EDS) images showing the manganese distribution in the regions shown in FIGS. 1 and 2, respectively. In these EDS images, the higher the lightness, the higher is the Mn concentration. In the MgO-free chip, the localization of Mn in a region extending inward from the chip side surface to a depth of about 2 μm is found as shown in FIG. 4. By contrast, in the MgO-containing chip, manganese is not localized as seen from FIG. 3.

Next, to examine the crystal structure of the Mn localized region shown in FIG. 4, this region was analyzed by x-ray diffractometry. As a result, the presence of more $NiMn_2O_4$ in the Mn localized region was found. By contrast, in the MgO-containing chip, the formation of $NiMn_2O_4$ near the internal electrode end was found, but in a minimal amount as indicated by the diffraction peak intensity.

Since an oxide in the form of $NiMn_2O_4$ precipitates near the internal electrode end, it is believed that the oxidation of the internal electrode is correlated to that precipitation. Then a comparative chip was prepared like the above chip except that MgO was omitted and the re-oxidizing treatment was omitted. On observation of a composition image of the comparative chip, the precipitation of $NiMn_2O_4$ was not found. This result indicates that the end of the nickel internal electrode comes in contact with the oxidizing atmosphere during the re-oxidizing treatment, and manganese migrates thereto to form $NiMn_2O_4$.

To examine the behavior of manganese migration, a silicon rich phase existing at a grain boundary in the ceramic body was analyzed by EDS. As a result, the silicon rich phase of the MgO-containing chip contained 0.5 mol % of MnO, but in the MgO-free chip, the MnO concentration of the silicon rich phase was as low as 0.15 mol %. These results suggest that MgO inhibits Mn from migrating from within the silicon rich phase. It is noted that this silicon rich phase is a Ca—Si rich phase in which both the contents of $SiO_2$ and CaO are higher than the average concentrations throughout the ceramic body, the $SiO_2$ concentration within the phase being 31.6 mol %.

Example 2

To further examine the behavior of manganese in the silicon rich phase, chips were prepared as in Example 1 except that the amounts of $(BaCa)SiO_3$, $MnCO_3$ and MgO added were changed as shown in Table 1. The addition amounts shown in Table 1 are molar percents based on the main component.

For these chips, the $SiO_2$ and MnO concentrations in the silicon rich phase were determined by TEM-EDS analysis, and they were examined whether or not $NiMn_2O_4$ precipitated near the internal electrode end. The results are shown in Table 1. It is noted that no silicon rich phase developed in those chips in which the $SiO_2$ concentration in the silicon rich phase is reported in Table 1 to be less than 10 mol %. For those chips in which no silicon rich phase developed, the $SiO_2$ concentration was measured within crystal grains.

TABLE 1

| Chip No. | Addition amount (mol %) | | | Concentration in Si rich phase (mol %) | | Precipitation of $NiMn_2O_4$ |
|---|---|---|---|---|---|---|
| | $(BaCa)SiO_3$ | $MnCO_3$ | MgO | $SiO_2$ | MnO | |
| 1 | 0.45 | 1 | — | 0.8 | 0.1 | nil |
| 2 | 2 | 0.1 | — | 2.1 | 0.1 | nil |
| 3 | 2 | 2 | — | 18.5 | 0.7 | precipitated |
| 4 | 2 | 2 | 0.6 | 19.6 | 0.8 | nil |
| 5 | 2.5 | 1 | — | 25.5 | 0.8 | precipitated |
| 6 | 2.5 | 1 | 4.7 | 19.8 | 0.9 | nil |
| 7 | 3 | 0.5 | — | 31.9 | 1.1 | precipitated |

It is seen from Table 1 that the silicon rich phase develops when the amounts of $(BaCa)SiO_3$ and $MnCO_3$ added are above certain levels. It is also evident that the addition of MgO is necessary to prevent precipitation of $NiMn_2O_4$ under the conditions allowing the silicon rich phase to develop. When the proportion of the MnO concentration in the silicon rich phase relative to the amount of $MnCO_3$ added to the entire chip is compared in Table 1, the MgO-added chips give a higher proportion than the MgO-free chips. It is thus believed that the addition of MgO suppresses the migration of MnO from the silicon rich phase and consequently, inhibits the precipitation of $NiMn_2O_4$. It is noted that chip Nos. 1 and 2 were short-sintered because the amounts of $(BaCa)SiO_3$ and $MnCO_3$ added were small.

Figure 5:
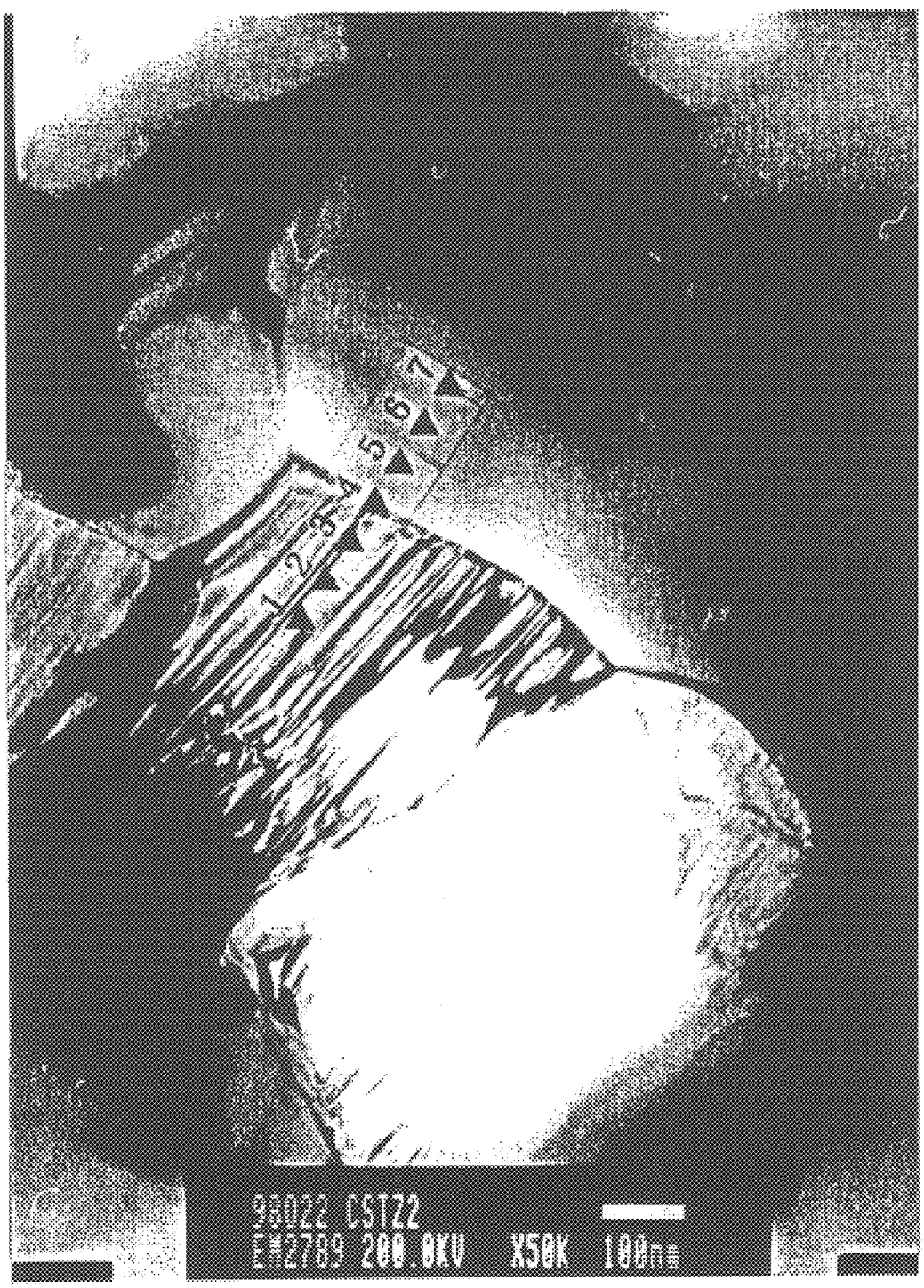
FIG. 5 is a drawing-substituting photograph representative of ceramic material structure, in the form of an TEM photomicrograph of a multilayer ceramic capacitor.
Figure 6:
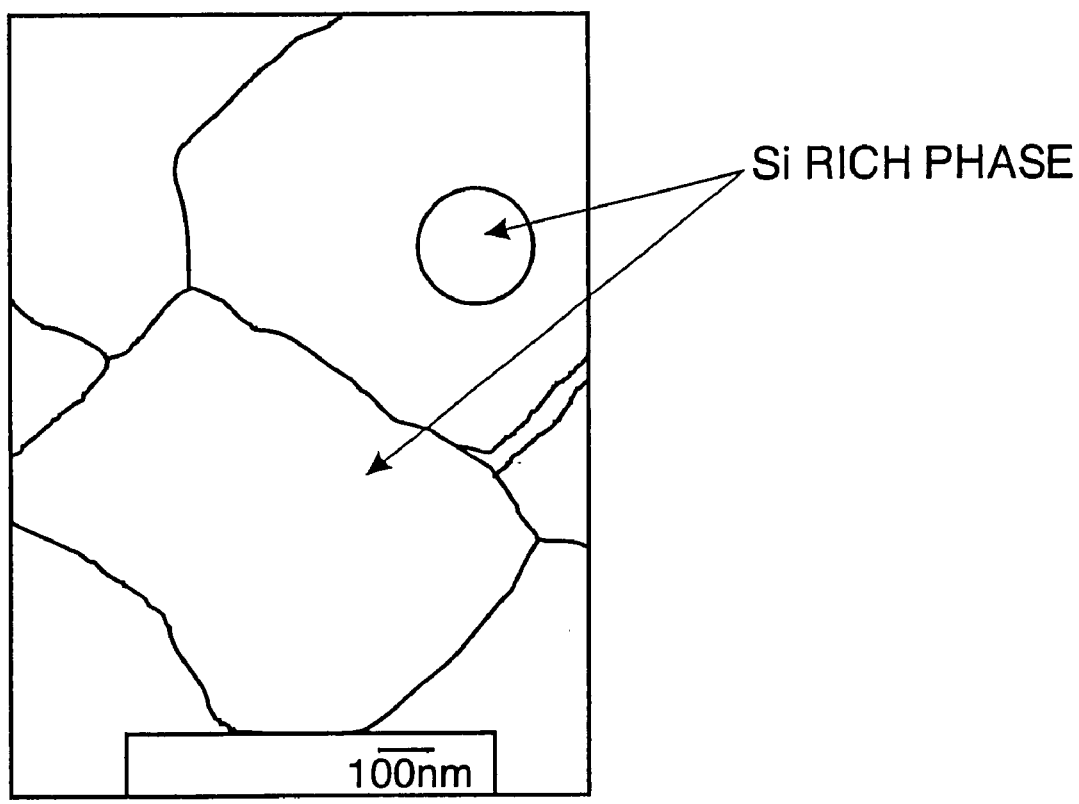
FIG. 6 is a diagram tracing the TEM photomicrograph of FIG. 5.

To illustrate the typical characteristics of the silicon rich phase, a TEM photomicrograph of chip No. 7 in Table 1 is presented as FIG. 5. The location of the silicon rich phase in FIG. 5 is depicted in FIG. 6 which is drawn by tracing the photograph of FIG. 5. In FIG. 5, inverted triangles indicate the points subject to compositional analysis by TEM-EDS and are not related to the material structure. In FIG. 5, silicon rich phases are present at grains boundaries and within crystal grains. A lamella structure is observed in some of the silicon rich phases in FIG. 5 although there are non-structured silicon rich phases too. On analysis by electron beam diffraction, both the non-structured phases and the lamella structured phases were found crystalline.

It was found that when a rare earth oxide was added, the migration of MnO from the silicon rich phase was also inhibited.

Example 3

Chips were prepared as in Example 1 except that the proportions of MgO and $Al_2O_3$ relative to the main component are changed as shown in Table 2 and the proportion of $(BaCa)SiO_3$ relative to the main component was set at 2 mol %. These chips were examined whether or not $NiMn_2O_4$ precipitated. The results are shown in Table 2.

TABLE 2

| Chip No. | Addition amount (mol%) MgO | $Al_2O_3$ | Precipitation of $NiMn_2O_4$ |
|---|---|---|---|
| 8 | 0 | — | precipitated |
| 9 | 1 | — | nil |
| 10 | 2 | — | nil |
| 11 | 6 | — | nil |
| 12 | 1 | 0.1 | nil |
| 13 | 6 | 0.2 | nil |

It is seen from Table 2 that the addition of MgO is effective for inhibiting precipitation of $NiMn_2O_4$. It is noted that an additional chip containing 20 mol % based on the main component of MgO was prepared, but it was short-sintered. A further chip containing 20 mol % based on the main component of $Al_2O_3$ was prepared, but it had a noticeably low dielectric constant.

Example 4

Chips were prepared as in Example 1 except that a rare earth oxide was added in a proportion based on the main component as shown in Table 3, the proportion of $Al_2O_3$ based on the main component was as shown in Table 3, the proportion of $(BaCa)SiO_3$ based on the main component was 2 mol %, and MgO was omitted. These chips were examined whether or not $NiMn_2O_4$ precipitated. The results are shown in Table 3.

TABLE 3

| Chip No. | Addition amount (mol %) Rare earth oxide | $Al_2O_3$ | Precipitation of $NiMn_2O_4$ |
|---|---|---|---|
| 14 | — | — | precipitated |
| 15 | $ScO_{3/2}$ 2 | — | nil |
| 16 | $LaO_{3/2}$ 5 | — | nil |
| 17 | $YO_{3/2}$ 0.2 | — | nil |
| 18 | $YO_{3/2}$ 5 | — | nil |
| 19 | — | 0.08 | precipitated |
| 20 | $ScO_{3/2}$ 0.2 | 0.08 | nil |
| 21 | $LaO_{3/2}$ 0.2 | 0.08 | nil |
| 22 | $YO_{3/2}$ 0.2 | 0.08 | nil |
| 23 | $YO_{3/2}$ 1 | 0.08 | nil |

It is seen from Table 3 that the addition of rare earth oxide is effective for inhibiting precipitation of $NiMn_2O_4$. It is noted that additional chips were prepared by adding MgO to the rare earth oxide-containing compositions among the compositions shown in Table 3, and no precipitation of $NiMn_2O_4$ was observed in these chips.

BENEFITS OF THE INVENTION

In conjunction with the manufacture of a multilayer ceramic capacitor having nickel-containing internal electrodes involving a polishing step for exposing the end of the internal electrodes, the invention is successful in preventing the polishing step from being prolonged and improving productivity. The polishing is briefly completed to prevent the occurrence of defects such as cracks in the ceramic matrix.

What is claimed is:

1. A non-reducible dielectric ceramic material comprising a compound oxide represented by the formula (I):

$$[(Ca_xSr_{1-x})O]_m[(Ti_yZr_{1-y})O_2]$$

wherein $0 \leq x \leq 1$, $0 \leq y \leq 0.10$, and $0.75 \leq m \leq 1.04$, as a main component, 0.5 to 15 mol % based on the main component of $SiO_2$ and BaO and/or CaO as an auxiliary component, these oxides being calculated as a compound oxide represented by the formula (II):

$$[(Ba_zCa_{1-z})O]_vSiO_2$$

wherein $0 \leq z \leq 1$ and $0.5 \leq v \leq 4.0$, 0.2 to 5 mol % based on the main component of MnO as an auxiliary component, and 0.001 to 10 mol % based on the main component of MgO as an additive component, said material having been prepared by adding a starting raw material for the additive component to a calcined material containing the main component, followed by firing.

2. A non-reducible dielectric ceramic material according to claim 1 further comprising up to 10 mol % based on the main component of $Al_2O_3$ as an auxiliary component.

3. A non-reducible dielectric ceramic material according to claim 1 which includes a silicon rich phase having a $SiO_2$ concentration which exceeds the average $SiO_2$ concentration of the entire ceramic material and is at least 10 mol %.

4. A non-reducible dielectric ceramic material according to claim 1 which is free of lithium.

5. A multilayer ceramic capacitor comprising a non-reducible dielectric ceramic material according to claim 1 as a dielectric material and internal electrodes containing at least nickel.

6. A non-reducible dielectric ceramic material comprising a compound oxide represented by the formula (I):

$$[(Ca_xSr_{1-x})O]_m[(Ti_yZr_{1-y})O_2]$$

wherein $0 \leq x \leq 1$, $0 \leq y \leq 0.10$, and $0.75 \leq m \leq 1.04$, as a main component, 0.5 to 15 mol % based on the main component of $SiO_2$ as an auxiliary component, 0.2 to 5 mol % based on the main component of MnO as an auxiliary component, and 0.01 to 10 mol % based on the main component of at least one rare earth oxide selected from the group consisting of oxides of Sc, Y, La, Ce, Pr, Nd, Sm, Eu, Gd, Tb, Dy, Ho, Er, Tm, Yb and Lu, as an additive component, said ceramic material being free of $Al_2O_3$.

7. A non-reducible dielectric ceramic material according to claim 6 wherein the auxiliary component includes CaO and/or BaO, which are contained along with $SiO_2$ in such proportions as to provide a compound oxide represented by the formula (II):

$$[(Ba_zCa_{1-z})O]_vSiO_2$$

wherein $0 \leq z \leq 1$ and $0.5 \leq v \leq 4.0$.

8. A non-reducible dielectric ceramic material according to claim 6 further comprising MgO.

9. A non-reducible dielectric ceramic material according to claim 6 which includes a silicon rich phase having a $SiO_2$ concentration which exceeds the average $SiO_2$ concentration of the entire ceramic material and is at least 10 mol %.

10. A non-reducible dielectric ceramic material according to claim 6 which is free of lithium.

11. A multilayer ceramic capacitor comprising a non-reducible dielectric ceramic material according to claim 6 as a dielectric material and internal electrodes containing at least nickel.

12. A non-reducible dielectric ceramic material comprising a compound oxide represented by the formula (I):

$$[(Ca_xSr_{1-x})O]_m[(Ti_yZr_{1-y})O_2]$$

wherein $0 \leq x \leq 1$, $0 \leq y \leq 0.10$, and $0.75 \leq m \leq 1.04$, as a main component, 0.5 to 15 mol % based on the main component of $SiO_2$ as an auxiliary component, 0.2 to 5 mol % based on the main component of MnO as an auxiliary component, 0.01 to 10 mol % based on the main component of at least one rare earth oxide selected from the group consisting of oxides of Sc, Y, La, Ce, Pr, Nd, Sm, Eu, Gd, Tb, Dy, Ho, Er, Tm, Yb and Lu, as an additive component, and less than 0.1 mol % based on the main component of $Al_2O_3$ as an auxiliary component.

13. A multilayer ceramic capacitor comprising a non-reducible dielectric ceramic material according to claim 12 as a dielectric material and internal electrodes containing at least nickel.

14. A non-reducible dielectric ceramic material comprising a compound oxide represented by the formula (I):

$$[(Ca_xSr_{1-x})O]_m[(Ti_yZr_{1-y})O_2]$$

wherein $0 \leq x \leq 1$, $0 \leq y \leq 0.10$, and $0.75 \leq m \leq 1.04$, as a main component, 0.5 to 15 mol % based on the main component of $SiO_2$ as an auxiliary component, 0.2 to 5 mol % based on the main component of MnO as an auxiliary component, and more than 1.5 to 10 mol % based on the main component of at least one rare earth oxide selected from the group consisting of oxides of Sc, Y, La, Ce, Pr, Nd, Sm, Eu, Gd, Tb, Dy, Ho, Er, Tm, Yb and Lu, as an additive component.

15. A non-reducible dielectric ceramic material according to claim 14 further comprising 0.1 to 10 mol % based on the main component of $Al_2O_3$ as an auxiliary component.

16. A non-reducible dielectric ceramic material according to claim 14 wherein the auxiliary component includes CaO and/or BaO, which are contained along with $SiO_2$ in such proportions as to provide a compound oxide represented by the formula (II):

$$[(Ba_zCa_{1-z})O]_vSiO_2$$

wherein $0 \leq z \leq 1$ and $0.5 \leq v \leq 4.0$.

17. A non-reducible dielectric ceramic material according to claim 14 further comprising MgO.

18. A non-reducible dielectric ceramic material according to claim 14 which includes a silicon rich phase having a $SiO_2$ concentration which exceeds the average $SiO_2$ concentration of the entire ceramic material and is at least 10 mol %.

19. A non-reducible dielectric ceramic material according to claim 14 which is free of lithium.

20. A multilayer ceramic capacitor comprising a non-reducible dielectric ceramic material according to claim 14 as a dielectric material and internal electrodes containing at least nickel.

21. A method for preparing a non-reducible dielectric ceramic material comprising a compound oxide represented by the formula (I):

$$[(Ca_xSr_{1-x})O]_m[(Ti_yZr_{1-y})O_2]$$

wherein $0 \leq x \leq 1$, $0 \leq y \leq 0.10$, and $0.75 \leq m \leq 1.04$, as a main component, 0.5 to 15 mol % based on the main component of $SiO_2$ and BaO and/or CaO as an auxiliary component, these oxides being calculated as a compound oxide represented by the formula (II):

$$[(Ba_zCa_{1-z})O]_vSiO_2$$

wherein $0 \leq z \leq 1$ and $0.5 \leq v \leq 4.0$, 0.2 to 5 mol % based on the main component of MnO as an auxiliary component, and 0.001 to 10 mol % based on the main component of MgO as an additive component, said method comprising the steps of adding a starting raw material for the additive component to a calcined material containing the main component, followed by firing.

* * * * *